US008720207B2

(12) United States Patent
Gersbach et al.

(10) Patent No.: US 8,720,207 B2
(45) Date of Patent: May 13, 2014

(54) GAS TURBINE STATOR/ROTOR EXPANSION STAGE HAVING BUMPS ARRANGED TO LOCALLY INCREASE STATIC PRESSURE

(75) Inventors: Frank Gersbach, Kuessaberg-Reckingen (DE); Christian Sommer, Nussbaumen (CH); Willy Heinz Hofmann, Baden-Ruetihof (CH); Ulrich Steiger, Baden-Daettwil (CH)

(73) Assignee: Alstom Technology Ltd, Baden (CH)

( * ) Notice: Subject to any disclaimer, the term of this patent is extended or adjusted under 35 U.S.C. 154(b) by 1048 days.

(21) Appl. No.: 12/771,876

(22) Filed: Apr. 30, 2010

(65) Prior Publication Data

US 2010/0278644 A1 Nov. 4, 2010

(30) Foreign Application Priority Data

May 4, 2009 (EP) .................................... 09159355

(51) Int. Cl.
*F02C 3/04* (2006.01)

(52) U.S. Cl.
USPC ........... 60/805; 415/914; 415/191; 415/208.2

(58) Field of Classification Search
USPC ................ 415/914, 191, 208.2, 209.4, 210.1; 60/722, 805, 806
See application file for complete search history.

(56) References Cited

U.S. PATENT DOCUMENTS 5,466,123 A 11/1995 Rose
6,419,446 B1 * 7/2002 Kvasnak et al. .............. 415/191
6,884,029 B2 * 4/2005 Beeck ........................... 415/191
6,969,232 B2 * 11/2005 Zess et al. ...................... 415/191
7,217,096 B2 * 5/2007 Lee ............................. 416/97 R
7,220,100 B2 * 5/2007 Lee et al. ....................... 415/191
7,625,181 B2 * 12/2009 Matsuda et al. .......... 416/193 A
8,105,037 B2 * 1/2012 Grover et al. ............. 416/193 A
8,206,115 B2 * 6/2012 Gupta et al. .............. 416/193 A (Continued)

FOREIGN PATENT DOCUMENTS

EP 1 681 438 A2 7/2006
GB 2 417 053 A 2/2006
WO WO 2008/120748 A1 10/2008
WO WO 2009/019282 A2 2/2009

OTHER PUBLICATIONS

European Search Report dated Oct. 23, 2009.

*Primary Examiner* — William H Rodriguez
(74) *Attorney, Agent, or Firm* — Buchanan Ingersoll & Rooney PC

(57) ABSTRACT

A gas turbine is disclosed which includes an annular combustion chamber defined by an inner wall and an outer wall. A stator airfoil row can be defined by an annular inner stator wall and an annular outer stator wall housing a plurality of stator airfoils, and at least a rotor airfoil row defined by an annular inner rotor wall and an annular outer rotor wall housing a plurality of rotor airfoils. A gap is arranged, for example, between at least one of the inner stator wall and the inner combustion chamber wall, and the outer stator wall and the outer combustion chamber wall, upstream of said stator airfoil row. A border of at least one of the inner and outer stator wall facing the gap can be axisymmetric. A zone of at least one of the inner and outer stator wall downstream of the gap and upstream of the stator airfoils can be non-axisymmetric and defines bumps arranged to locally increase the static pressure of a fluid flow passing through said stator airfoil row to increase the uniformity of the static pressure.

19 Claims, 5 Drawing Sheets

(56) References Cited

U.S. PATENT DOCUMENTS

| | | | | |
|---|---|---|---|---|
| 8,511,978 | B2 * | 8/2013 | Allen-Bradley et al. | 415/191 |
| 2006/0034689 | A1 | 2/2006 | Taylor et al. | |
| 2006/0140768 | A1 | 6/2006 | Tam et al. | |
| 2007/0081898 | A1 * | 4/2007 | Matsuda et al. | 416/193 A |
| 2010/0146988 | A1 * | 6/2010 | Steiger et al. | 60/806 |
| 2010/0172749 | A1 * | 7/2010 | Mitsuhashi et al. | 415/193 |
| 2010/0196154 | A1 * | 8/2010 | Sakamoto et al. | 415/208.2 |

* cited by examiner

Prior Art

GAS TURBINE STATOR/ROTOR EXPANSION STAGE HAVING BUMPS ARRANGED TO LOCALLY INCREASE STATIC PRESSURE

RELATED APPLICATIONS

This application claims priority under 35 U.S.C. §119 to European Patent Application No. 09159355.8 filed in Europe on May 4, 2009, the entire content of which is hereby incorporated by reference in its entirety.

FIELD

The present disclosure relates to a gas turbine. For example, the present disclosure relates to a non-axisymmetric design of the inner and/or outer walls of a stator airfoil row.

BACKGROUND INFORMATION

Gas turbines have combustion chambers wherein a fuel can be combusted to generate a hot gas flow to be expanded in one or more expansion stages of a turbine.

Each expansion stage can include a stator airfoil row and a rotor airfoil row. During operation, the hot gas generated in the combustion chamber passes through the stator airfoil row to be accelerated and turned, and afterwards it passes through the rotor airfoil row to deliver mechanical power to the rotor.

In a gas turbine assembly, between the inner and outer wall of the combustion chamber and the inner and outer wall of the stator airfoil row, gaps can be provided. Cooling air for cooling the combustion chamber and the stator airfoil row inner and outer walls can be ejected through these gaps into the hot gases path.

In addition, also between the stator and the rotor airfoil row inner and outer walls a gap can be provided. Cooling air can be fed through these gaps also.

As the stator airfoils extend in the paths of the hot gas, they can constitute a blockage for the hot gas flow.

Thus, stator airfoils can generate regions of high static pressure in the stagnation regions upstream of their leading edges and regions of lower static pressure in the regions in-between.

The result can be a non-uniform circumferential static pressure distribution upstream of the stator airfoil row (called bow-wave) which varies in a roughly sinusoidal manner.

This pressure distribution can cause hot gas to enter into the gaps. This should be avoided because it can cause overheating of structural parts adjacent to the gaps.

This problem has been addressed by supplying additional air (purge air) fed through the gaps at high pressure (i.e. pressure greater than the sinusoidal pressure peaks).

As a consequence, the total amount of cold air (cooling air+purge air) fed through the gaps can be much greater than that necessary for cooling of the parts making up the hot gas flow channel.

Such an excessive cold air can be undesirable, because it causes the overall power and efficiency of the gas turbine to be reduced.

In order to reduce the amount of purge air fed, U.S. Pat. No. 5,466,123 discloses a gas turbine having a stator and a rotor with gaps between their inner and outer walls.

The inner stator wall has an upstream zone (the zone upstream of the stator airfoils) that is axisymmetric, and a downstream zone (the zone in the guide vane flow channels defined by two adjacent stator airfoils) that is non-axisym metric.

This configuration of the inner stator wall can let the non-uniformities (i.e. the peaks) of the hot gases pressure in a zone downstream of the stator airfoils be counteracted, but it has no influence on the hot gases pressure upstream of the stator airfoils.

WO2009/019282 discloses a gas turbine having a combustion chamber followed by a stator (and a rotor) airfoil row. Between the inner and/or outer wall of the combustion chamber and stator airfoil row a gap can be provided through which cold air can be fed. The borders of the gaps of the stator and/or combustion chamber inner and/or outer walls have radial steps that cooperate to influence the pressure distribution in the gaps.

SUMMARY

A gas turbine is disclosed comprising: an annular combustion chamber defined by an inner wall and an outer wall: a stator airfoil row defined by an annular inner stator wall and an annular outer stator wall housing a plurality of stator airfoils, and at least a rotor airfoil row defined by an annular inner rotor wall and an annular outer rotor wall housing a plurality of rotor airfoils; a gap between at least one of the inner stator wall and the inner combustion chamber wall, and the outer stator wall and the outer combustion chamber wall, upstream of said stator airfoil row, wherein a border of at least one of the inner and outer stator wall facing the gap is axisymmetric, and a zone of the at least one inner and outer stator wall downstream of the gap and upstream of the stator airfoils is non-axisymmetric and defines bumps arranged to locally increase static pressure of a fluid flow passing through said stator airfoil row to increase uniformity of the static pressure.

BRIEF DESCRIPTION OF THE DRAWINGS

Further characteristics and advantages of the disclosure will be more apparent from the description of a preferred, non-exclusive embodiments of gas turbines according to the disclosure, illustrated by way of non-limiting example in the accompanying drawings, in which.

DETAILED DESCRIPTION

A gas turbine according to an exemplary embodiment is disclosed in which cold air fed into a hot gas path can be reduced when compared to known gas turbines.

An exemplary gas turbine is provided where the efficiency can be increased and overheating of the rotor disc and static structure adjacent to it can be limited.

The exemplary gas turbine can also let the power output be increased with respect to known gas turbines.

With reference to the figures, these show a schematic view of a hot section of an exemplary gas turbine overall indicated by the reference number 1. For sake of simplicity in the following, the hot section of the gas turbine is referred to as the gas turbine.

Figure 1:
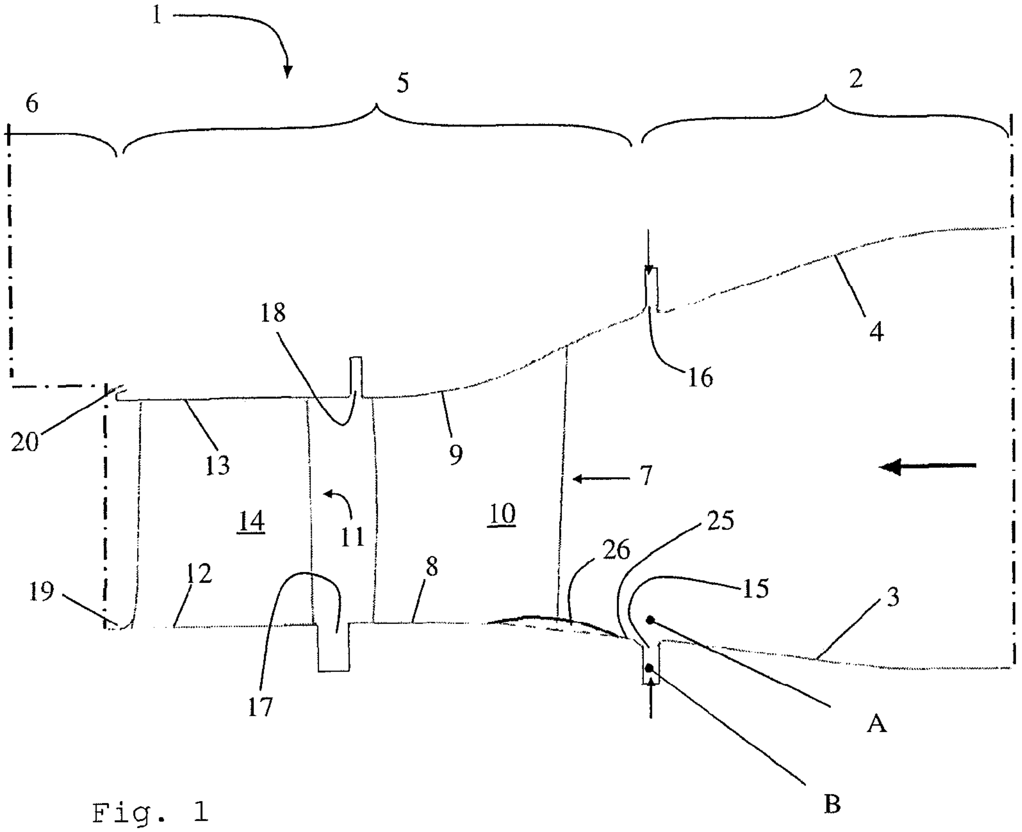
FIG. 1 is a schematic view of a hot section of an exemplary gas turbine, including a combustion chamber and an expansion stage.
Figure 2:
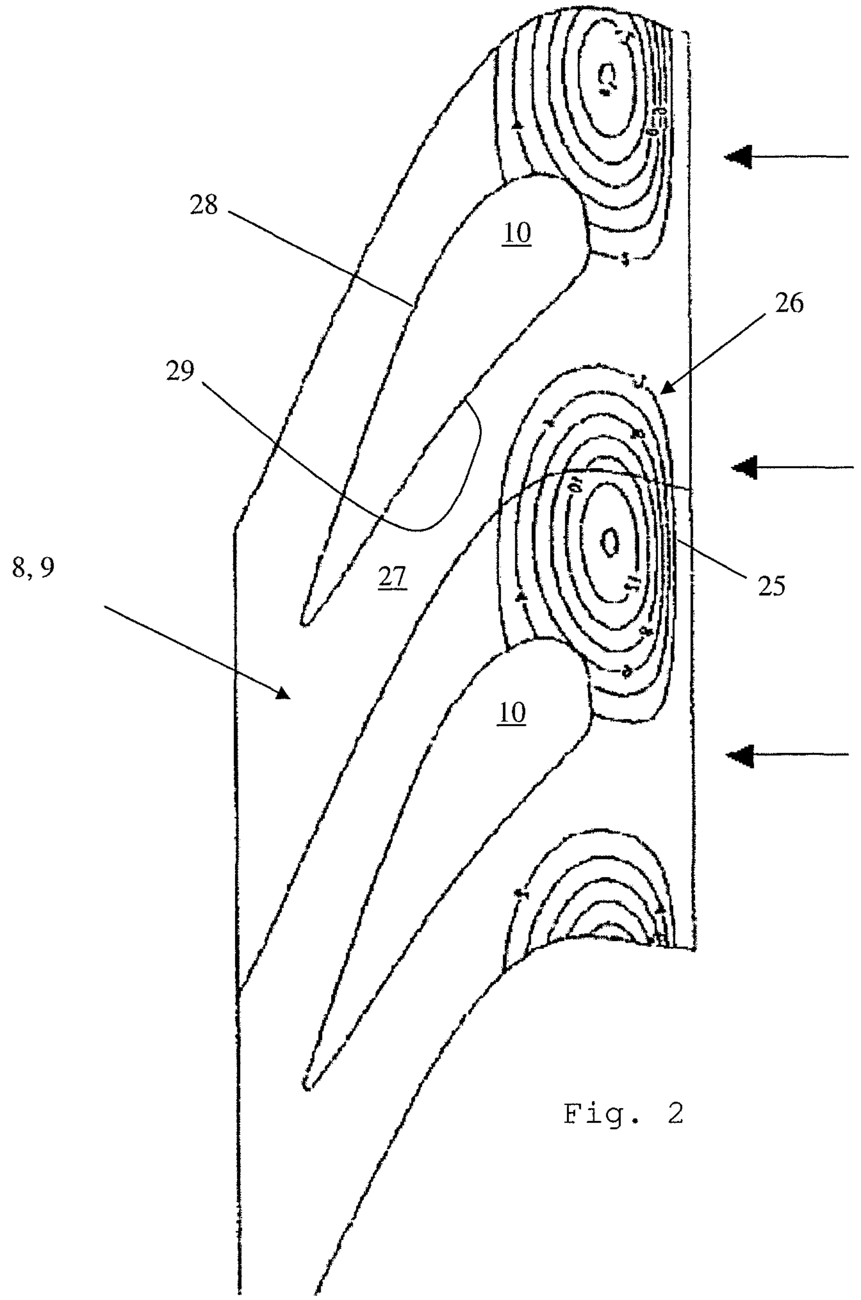
FIG. 2 is a top view of a portion of an exemplary stator airfoil row, in which contour lines of equal radii are used to visualise an endwall modification due to the bumps.
Figure 3:
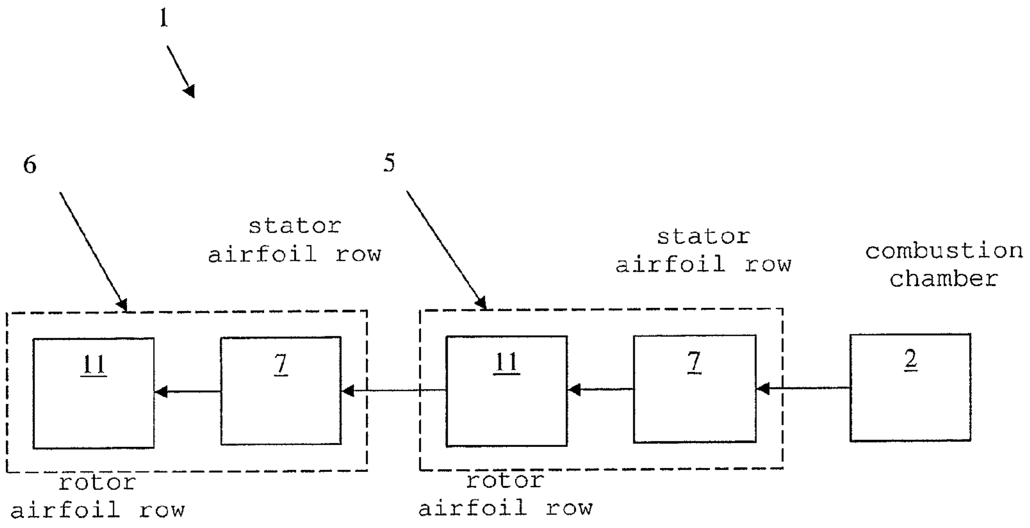
FIG. 3 illustrates an exemplary gas turbine.

The exemplary gas turbine 1 of FIGS. 1-3 includes an annular combustion chamber 2 defined by an inner wall 3 and an outer wall 4.

Downstream of the combustion chamber 2 one or more expansion stages 5, 6 can be provided to expand the hot gas coming from the combustion chamber 2.

Each expansion stage 5, 6 can be defined by a stator airfoil row 7 defined by an annular inner stator wall 8 and an annular outer stator wall 9 housing a plurality of stator airfoils 10.

Downstream of each stator airfoil row 7, a rotor airfoil row 11 can be provided. The rotor airfoil row 11 can be defined by an annular inner rotor wall 12 and an annular outer rotor wall 13 housing a plurality of rotor airfoils 14.

The walls 3, 4 of the combustion chamber 2 can be adjacent to the walls 8, 9 of a first airfoil row 7 but an inner and an outer gap 15, 16 can be provided between them.

Through these gaps 15, 16 cold air can be supplied (in this context the temperature of the cold air can be defined as colder than the temperature of the hot gas).

In addition, gaps 17, 18 can also be provided between the inner stator and rotor walls 8, 12, and between the outer stator and rotor walls 9, 13. Also through these gaps 17, 18 cold air can be supplied.

The expansion stage 6 downstream of the expansion stage 5 has the same configuration of the expansion stage 5. Thus an inner and an outer gap 19, 20 can be provided between the rotor inner and outer walls 12, 13 of the stage 5 and the stator inner and outer walls of the stage 6.

Possible further expansion stages can have the same configuration.

Naturally, different combinations can be possible such that one or more of the described gaps may not be present.

In the following, the disclosure will be described with particular reference to the expansion stage 5 immediately downstream of the combustion chamber 2 and the inner stator wall 8. The same considerations can apply for the outer stator wall 9 of the expansion stage 5, and for the inner and/or outer stator walls of each stage downstream of a rotor airfoil row (such as, for example, the stator inner and/or outer walls of the expansion stage 6 downstream of the rotor airfoil row 11).

A border 25 of the inner stator wall 8 facing the gap 15 can be axisymmetric and, for example, circular (or any other desired contour) in shape. It can be aligned with the inner wall 3 of the combustion chamber 2 to guide the hot gases flow limiting the pressure drops.

Moreover, the zone of the inner stator wall 8 downstream of the gap 15 and upstream of the stator airfoils 10 can be non-axisymmetric and provide bumps 26, circumferentially located in the regions where the static pressure of the hot gas flow is lowest. The bumps 26 can be arranged to locally increase the static pressure of the hot gas flow passing close to them.

Figure 4:
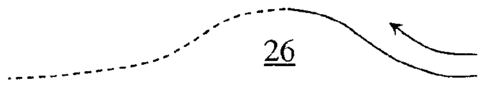
FIG. 4 is a detail of an exemplary bump as disclosed herein.

As shown in FIG. 4, the near-endwall hot gas flow can be guided such that the flow upstream of the bumps can be decelerated and its pressure locally increased.

This can allow the circumferential pressure distribution of the hot gas flow upstream of the stator airfoil row to be more uniform, because in the regions having higher pressure, the pressure remains substantially unchanged but in the regions having lower pressure it can be increased.

Moreover, the static pressure inside of the gaps can be influenced (for example, it can be increased).

Figure 5:
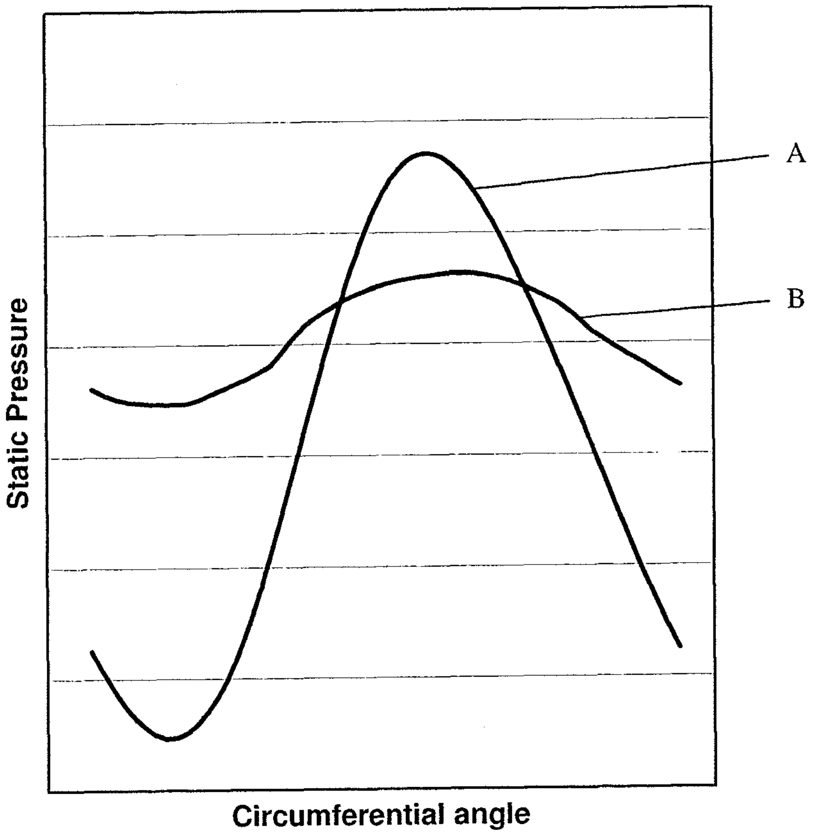
FIGS. 5 and 6 show an exemplary static pressure distribution across a flow passage in a region upstream of the stator airfoil row just outside (curve A) and within a gap (curve B) of a gas turbine according to the present disclosure.

In this respect, FIG. 5 (with reference to a known gas turbine) shows a circumferential static pressure distribution outside (curve A) and inside (curve B) of the gap 15.

Figure 6:
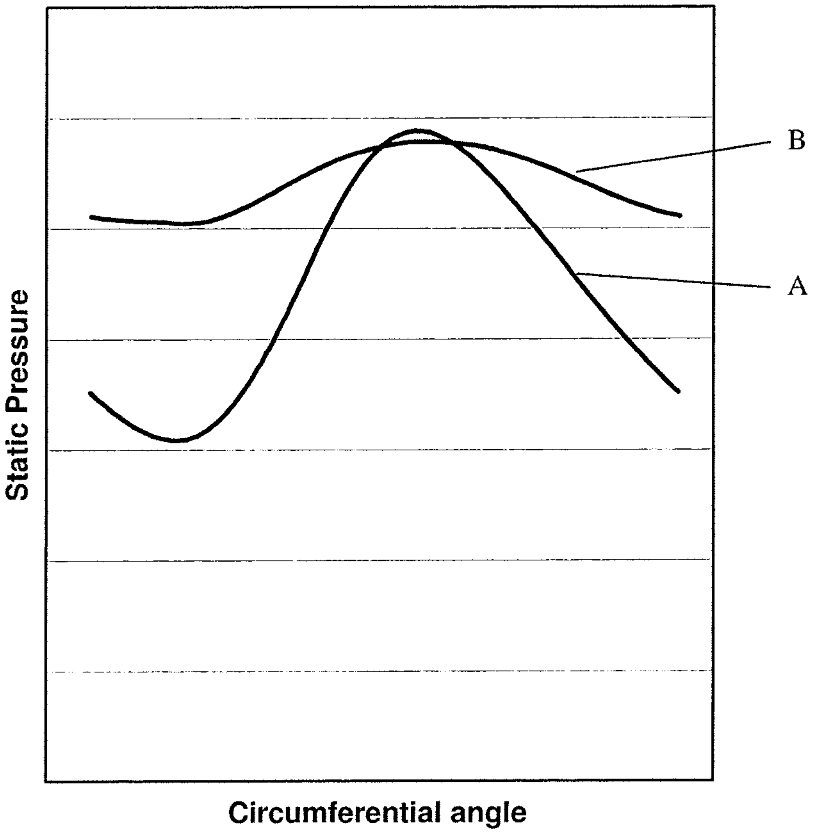

In the same way, FIG. 6 (referring to a gas turbine according to the disclosure) shows the circumferential static pressure distribution outside (curve A) and inside (curve B) of the gap 15 (see also FIG. 1).

From FIGS. 5 and 6 it can be recognised that the differential static pressure between the inside and outside of the gap can be reduced (e.g., the peak of differential pressure between curves A and B in the gas turbine of the disclosure can be lower than that between curves A and B of known gas turbines).

This negative pressure gradient pointing into the gap causes the hot gas entering the gap.

The exemplary configuration according to the disclosure can decrease the pressure gradient and therefore can minimize the amount of hot gas entering the gap 15.

The amount of cold air fed through the gap 15 can thus be reduced with respect to known gas turbines.

For example, each bump 26 faces a guide vane flow channel 27 defined between two adjacent stator airfoils 10.

Moreover, each bump 26 can be closer to the suction side 28 than to the pressure side 29 of the two adjacent stator airfoils 1, where a minimum region of circumferential pressure distribution is located.

The bumps 26 can extend into the guide vane flow channels 27, where they can fade to a common axisymmetric or non-axisymmetric shape of the inner stator wall 8. This downstream part of the bumps has no impact on the flow in the gap region and can therefore be chosen individually (FIG. 4, dashed line).

As shown in the figures, each bump 26 can surround a front portion of a stator airfoils 10.

The bumps 26 define an inner circumferentially sinusoidal stator wall 8 facing the gap 15.

The operation of the exemplary gas turbine of the disclosure is apparent from that described and illustrated and is substantially as follows:

The stator airfoils 10 (defining a blockage for the hot gases flow) can cause the static pressure of the hot gases flow to be locally increased upstream of the stator airfoils 10 with a substantially circumferential sinusoidal distribution.

The hot gas flow coming from the combustion chamber 2 passes close to the bumps 26 and locally increases its static pressure in the region upstream of the stator blade row 7, and enters the guide vane flow channels 27 defined between the stator airfoils 10.

The pressure increase caused by the bumps 26 occurs in the regions of low pressure upstream of the stator blade row 7, such that the circumferential pressure distribution upstream of the stator airfoils 10 can be more uniform. In addition the pressure difference between the inner and the outer of the gap can be reduced.

This lets the risk of hot gas ingestion be reduced, with no need of a high flow rate of cold air (cooling+purge air).

A gas turbine configured in this manner can be susceptible to numerous modifications and variants, all falling within the scope of the inventive concept. Moreover all details can be replaced by technically equivalent elements. In practice the materials used and the dimensions can be chosen at will according to desired specifications and/or requirements, and/or to the state of the art.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE NUMBERS

1 hot section of a gas turbine
2 combustion chamber
3 inner wall of 2
4 outer wall of 2
5, 6 expansion stages
7 stator airfoil row
8 inner stator wall
9 outer stator wall
10 stator airfoil
11 rotor airfoil row
12 inner rotor wall
13 outer rotor wall
14 rotor airfoil
15 inner gap between 2/7
16 outer gap between 2/7
17, 18 gap between 7/11
19, 20 gap downstream of 11
25 border of 8
26 bump
27 guide vane flow channel
28 suction side
29 pressure side
A, B static pressure distribution

What is claimed is:

1. Gas turbine comprising:

an annular combustion chamber defined by an inner wall and an outer wall;

a stator airfoil row defined by an annular inner stator wall and an annular outer stator wall housing a plurality of stator airfoils, and at least a rotor airfoil row defined by an annular inner rotor wall and an annular outer rotor wall housing a plurality of rotor airfoils; and a gap between at least one of the inner stator wall and the inner combustion chamber wall, and the outer stator wall and the outer combustion chamber wall, upstream of said stator airfoil row, wherein a border of at least one of the inner and outer stator wall facing the gap is axisymmetric, and a zone of the at least one inner and outer stator wall downstream of the gap and upstream of the stator airfoils is non-axisymmetric and defines bumps arranged to locally increase static pressure of a fluid flow passing through said stator airfoil row to increase uniformity of the static pressure.

2. Gas turbine according to claim 1, wherein each bump is located in regions where the static pressure of the hot gas flow is lowest.

3. Gas turbine according to claim 2, wherein said bumps are located along a circumference of at least one of the inner and outer stator walls.

4. Gas turbine according to claim 2, wherein each bump faces a guide vane flow channel defined between two adjacent stator airfoils.

5. Gas turbine according to claim 4, wherein each bump is closer to a suction side than to a pressure side of said two adjacent stator airfoils defining said guide vane flow channel.

6. Gas turbine according to claim 4, wherein each bump extends into the guide vane flow channel defined between two adjacent stator airfoils.

7. Gas turbine according to claim 1, wherein each bump surrounds a front portion of a stator airfoil.

8. Gas turbine according to claim 1, wherein said bumps define an inner and/or outer sinusoidal stator wall facing the gap.

9. Gas turbine according to claim 1, wherein said axisymmetric border of the inner and/or outer stator wall facing the gap is circular in shape.

10. Gas turbine according to claim 1, comprising:

a gap between at least one of the inner stator wall and the inner rotor wall, and the outer stator wall and the outer rotor wall.

11. Gas turbine according to claim 10, wherein said bumps define an inner and/or outer sinusoidal stator wall facing the gap.

12. Gas turbine according to claim 1, wherein said axisymmetric border of the inner and/or outer stator wall facing the at least one gap between at least one of the inner stator wall and the inner rotor wall and the outer stator wall and the outer rotor wall is circular in shape.

13. Gas turbine comprising:

an annular combustion chamber defined by an inner wall and an outer wall;

a stator airfoil row defined by an annular inner stator wall and an annular outer stator wall housing a plurality of stator airfoils, and at least a rotor airfoil row defined by an annular inner rotor wall and an annular outer rotor wall housing a plurality of rotor airfoils; and a gap between at least one of the inner stator wall and the inner rotor wall, and the outer stator wall and the outer rotor wall, upstream of said stator airfoil row, wherein a border of at least one of the inner and outer stator wall facing the gap is axisymmetric, and a zone of the at least one inner and outer stator wall downstream of the gap and upstream of the stator airfoils is non-axisymmetric and defines bumps arranged to locally increase static pressure of a fluid flow passing through said stator airfoil row to increase uniformity of the static pressure.

14. Gas turbine according to claim 13, wherein each bump is located in regions where the static pressure of the hot gas flow is lowest.

15. Gas turbine according to claim 14, wherein said bumps are located along a circumference of at least one of the inner and outer stator walls.

16. Gas turbine according to claim 14, wherein each bump faces a guide vane flow channel defined between two adjacent stator airfoils.

17. Gas turbine according to claim 16, wherein each bump is closer to a suction side than to a pressure side of said two adjacent stator airfoils defining said guide vane flow channel.

18. Gas turbine according to claim 13, wherein said bumps define an inner and/or outer sinusoidal stator wall facing the gap.

19. Gas turbine comprising:

an annular combustion chamber defined by an inner wall and an outer wall;

a stator airfoil row defined by an annular inner stator wall and an annular outer stator wall housing a plurality of stator airfoils, and at least a rotor airfoil row defined by an annular inner rotor wall and an annular outer rotor wall housing a plurality of rotor airfoils; and a gap between at least one of the inner stator wall and the inner combustion chamber wall, and the outer stator wall and the outer combustion chamber wall, upstream of said stator airfoil row, wherein a border of at least one of the inner and outer stator wall facing the gap is axisymmetric and at least partly outside of the gap, and a zone of the at least one inner and outer stator wall downstream of the gap and upstream of the stator airfoils is non-axisymmetric and defines bumps arranged to locally increase static pressure of a fluid flow passing through said stator airfoil row to increase uniformity of the static pressure.

* * * * *